(12) United States Patent
Miller et al.

(10) Patent No.: US 10,378,693 B2
(45) Date of Patent: Aug. 13, 2019

(54) CONDENSATE DRAIN

(71) Applicant: Spirax-Sarco Limited, Cheltenham, Gloucestershire (GB)

(72) Inventors: Jeremy Miller, Cheltenham (GB); Brian Chu, Cheltenham (GB); Kevin Rushbrooke, Cheltenham (GB); Simon Geuley, Cheltenham (GB)

(73) Assignee: Spirax-Sarco Limited, Cheltenham (GB)

( * ) Notice: Subject to any disclaimer, the term of this patent is extended or adjusted under 35 U.S.C. 154(b) by 99 days.

(21) Appl. No.: 15/512,356

(22) PCT Filed: Aug. 20, 2015

(86) PCT No.: PCT/GB2015/052418
§ 371 (c)(1),
(2) Date: Mar. 17, 2017

(87) PCT Pub. No.: WO2016/042288
PCT Pub. Date: Mar. 24, 2016

(65) Prior Publication Data
US 2017/0254475 A1  Sep. 7, 2017

(30) Foreign Application Priority Data

Sep. 17, 2014 (GB) .................................. 1416392.7

(51) Int. Cl.
*F16T 1/34* (2006.01)
(52) U.S. Cl.
CPC .................................... *F16T 1/34* (2013.01)
(58) Field of Classification Search
CPC ..... F16T 1/00–34; F16T 1/34; B01D 2325/38

USPC ......................................................... 137/177
See application file for complete search history.

(56) References Cited

U.S. PATENT DOCUMENTS

| 1,973,259 A | 9/1934 | Kiefer |
| 4,482,360 A | 11/1984 | Taketomo et al. |
| 4,583,996 A | 4/1986 | Sakata et al. |
| 4,874,522 A * | 10/1989 | Okamoto ............... B01D 69/02 210/645 |
| 5,070,899 A | 12/1991 | Matkovich et al. |
| 5,120,336 A * | 6/1992 | LeBlanc ................... F16T 1/34 55/466 |

(Continued)

FOREIGN PATENT DOCUMENTS

| CN | 1046031 A | 10/1990 |
| GB | 191306993 A | 10/1913 |

(Continued)

OTHER PUBLICATIONS

Jan. 23, 2015—(GB) Search Report—App. No. GB1416392.7—3 pages.
Oct. 28, 2015—(WO) International Search Report and Written Opinion—App. No. PCT/GB2015/052418—14 pages.

*Primary Examiner* — Ian G Paquette
(74) *Attorney, Agent, or Firm* — Banner & Witcoff, Ltd.

(57) ABSTRACT

There is disclosed a condensate drain, comprising: a body defining a drain chamber having a liquid-gas inlet and a liquid outlet; and a porous membrane having a pore size of about 0.2 μm or less disposed within the body between the liquid-gas inlet and the liquid outlet; wherein in use, the porous membrane permits liquid to pass therethrough but restricts the passage of gas.

18 Claims, 3 Drawing Sheets

(56) References Cited

U.S. PATENT DOCUMENTS

Figure 1:
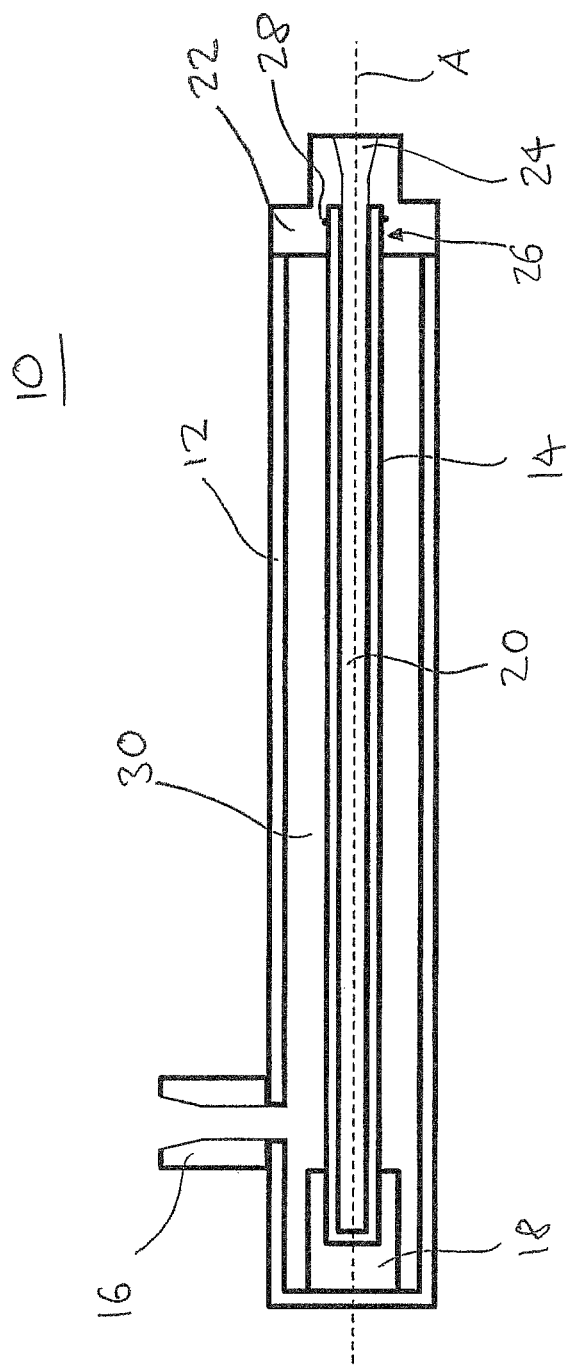

| | | | | |
|---|---|---|---|---|
| 5,948,128 | A | * | 9/1999 | Stavropoulos ............ F16T 1/34 137/177 |
| 6,436,172 | B1 | | 8/2002 | Rabiger |
| 6,495,281 | B1 | * | 12/2002 | Eshraghi ............... H01M 4/661 429/140 |
| 8,431,278 | B2 | | 4/2013 | Goebel et al. |
| 2011/0100488 | A1 | * | 5/2011 | Somrah ..................... F16T 1/34 137/544 |

FOREIGN PATENT DOCUMENTS

| | | |
|---|---|---|
| GB | 385599 A | 12/1932 |
| JP | H0828784 A | 2/1996 |
| JP | H08219383 A | 8/1996 |
| JP | H09122418 A | 5/1997 |
| JP | 3140699 B2 | 3/2001 |
| RU | 2346201 C2 | 2/2009 |
| WO | 2012057460 A2 | 5/2012 |

* cited by examiner

CONDENSATE DRAIN

CROSS REFERENCE TO RELATED APPLICATIONS

This application is a National Stage Application under 35 U.S.C. § 371 of co-pending PCT application number PCT/GB2015/052418, filed 20 Aug. 2015; which claims priority to GB1416392.7, filed 17 Sep. 2014, both of which are hereby incorporated by reference in their entireties for any and all non-limiting purposes.

The invention relates to a condensate drain having a porous membrane.

The main function of a condensate drain is to drain condensate from a flow system, such as a steam system, to which the condensate drain is connected. Several types of condensate drain are commonly used in industrial steam or compressed air systems, including thermostatic steam traps, thermodynamic steam traps, and mechanical (e.g. ball float) condensate drains.

Each of these known types of condensate drain is suitable for use with high pressure systems, such as steam or compressed air systems. In particular, the moving and non-moving parts of each of these known condensate drains can be engineered to withstand the high forces associated with opening and closing the condensate drain. However, each of these known types of condensate drain relies on a number of moving parts that are subject to wear and may require maintenance or replacement.

It is therefore desirable to provide an alternative condensate drain that may be easier to maintain.

According to a first aspect of the invention there is provided a condensate drain, comprising: a body defining a drain chamber having a liquid-gas inlet and a liquid outlet; and a porous membrane having a plurality of passageways (or pores), each having a pore size of about 0.2 μm or less disposed within the body between the liquid-gas inlet and the liquid outlet; wherein in use, the porous membrane permits liquid to pass therethrough but restricts the passage of gas.

The pore size may be about 0.15 μm or less, or about 0.1 μm or less, or about 0.08 μm or less, or about 0.06 μm or less, or about 0.04 μm or less.

The pore size may be non-constant along each passageway and the minimum pore size in each passageway may be about 0.2 μm or less, or about 0.15 μm or less, or about 0.1 μm or less, or about 0.08 μm or less, or about 0.06 μm or less, or about 0.04 μm or less. The minimum pore size of each passageway determines the capillary pressure for the passageway. The porous membrane may have no passageways in which the minimum pore size is greater than about 0.2 μm, or about 0.15 μm, or about 0.1 μm, or about 0.08 μm, or about 0.06 μm, or about 0.04 μm.

The porous membrane may comprise a support structure, and the pore size of the passageways in the region of the support structure may be greater than 0.2 μm, or 0.15 μm, or 0.1 μm, or 0.08 μm, or 0.06 μm, or 0.04 μm. The support structure may support one or more membrane layers of the porous membrane. Each passageway may extend through the support structure and the one or more membrane layers. The pore size may be non-constant along each passageway and the location of the minimum pore size may be in a membrane layer. The pore size of each passageway may gradually reduce through the porous membrane so that the pore size is greatest in the support structure and decreases through successive membrane layers. The pore size may relate to a dimension of a cross-section of a passageway, such as a diameter of the passageway, at any point along the length of the passageway including the opening.

The porosity of the porous membrane may be between about 10-50%, or about 20-40%, or about 30-35%. The area of the porous membrane area that may be exposed to a liquid-gas flow may be approximately 0.05 m$^2$-0.5 m$^2$, or about 0.1 m$^2$-0.3 m$^2$, for example approximately 0.2 m$^2$.

The porous membrane may be hydrophilic. The porous membrane may be a ceramic porous membrane. The ceramic porous membrane may comprise $Al_2O_3$ and/or $ZrO_2$ and/or $TiO_2$.

The porous membrane may be a tubular porous membrane with the liquid-gas inlet or liquid outlet in fluid communication with the interior of the tubular porous membrane. The tubular porous membrane may comprise a plurality of interior channels. Providing a plurality of interior channels may allow for a large number of pores within the membrane. There may be a plurality of tubular porous membranes disposed within the body, and the liquid-gas inlet or liquid outlet may be in fluid communication with the interior of each tubular porous membrane. Accordingly, the area of porous membrane available within the body can be increased by providing additional tubular porous membranes. In particular, providing a plurality of tubular porous membranes within the body may increase a drainage rate at which condensate can be drained from a system, such as a steam or compressed air system.

The length of the or each tubular porous membrane may be between 50 mm and 300 mm. The external diameter of the or each tubular porous membrane may be between 10 mm and 60 mm.

The body may be a tubular body. The tubular porous membrane and the tubular body may be substantially coaxial with one another. The liquid-gas inlet or liquid outlet may be provided at an end of the tubular body and may be coaxial therewith.

The drain chamber may be defined between the exterior of the or each tubular porous membrane and the interior of the tubular body, and the liquid-gas inlet or liquid outlet may be provided in a side wall of the tubular body and may open into the chamber.

The condensate drain may be configured such that in use the porous membrane is maintained wetted. The condensate drain may be configured such that in use the liquid outlet is disposed above or at the level or the porous membrane. The porous membrane of the condensate drain may remain wetted in use by virtue of the liquid outlet being coupled to a condensate system, such as a condensate return system for receiving and controlling a condensate flow.

The condensate drain may be free of moving parts.

According to a second aspect of the invention there is provided a condensate drain array comprising a plurality of condensate drains, each in accordance with the first aspect of the invention, connected in parallel with the liquid-gas inlets in fluid communication with a common liquid-gas inlet.

There is also provided a steam installation comprising one or more condensate drains in accordance with the first aspect of the invention, and/or one or more condensate drain arrays in accordance with the second aspect of the invention.

There is also provided a compressed gas system, such as a compressed air or refrigerant system, comprising one or more condensate drains in accordance with the first aspect of the invention, and/or one or more condensate drain arrays in accordance with the second aspect of the invention.

Figure 2:
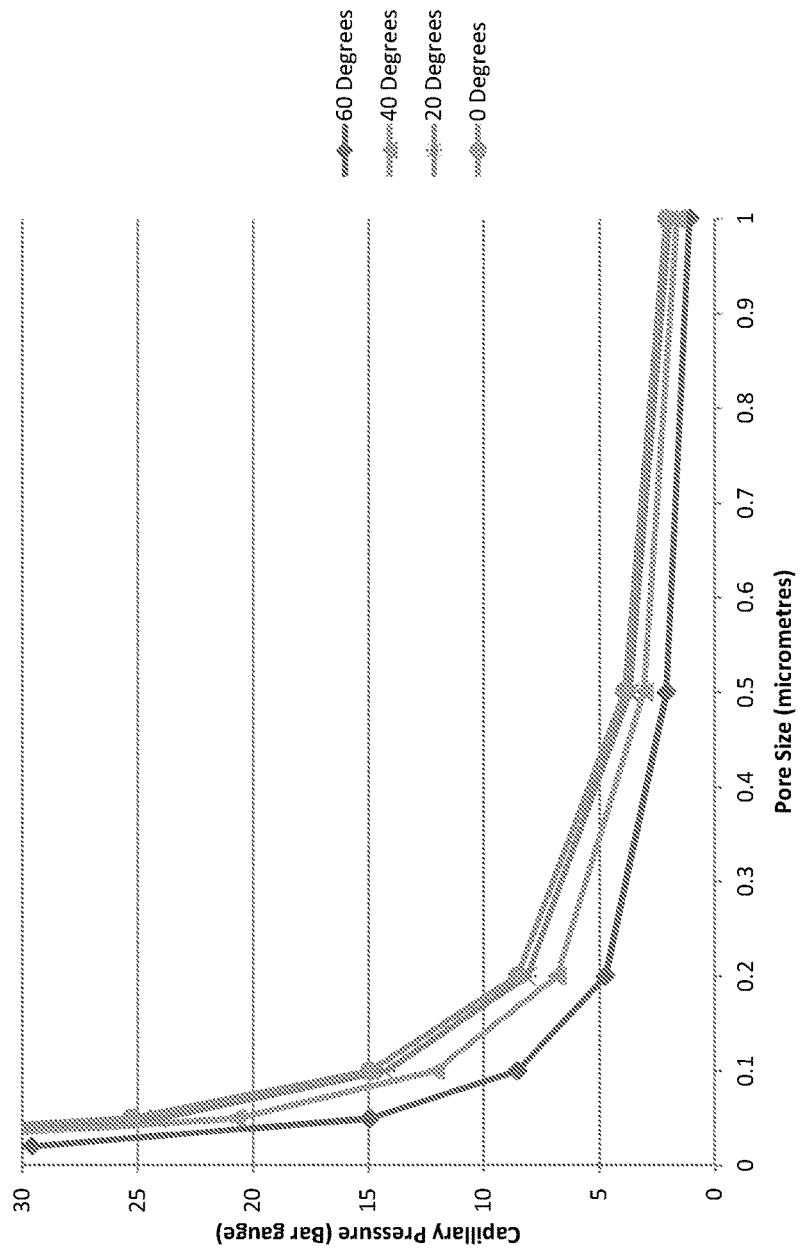
Figure 3:
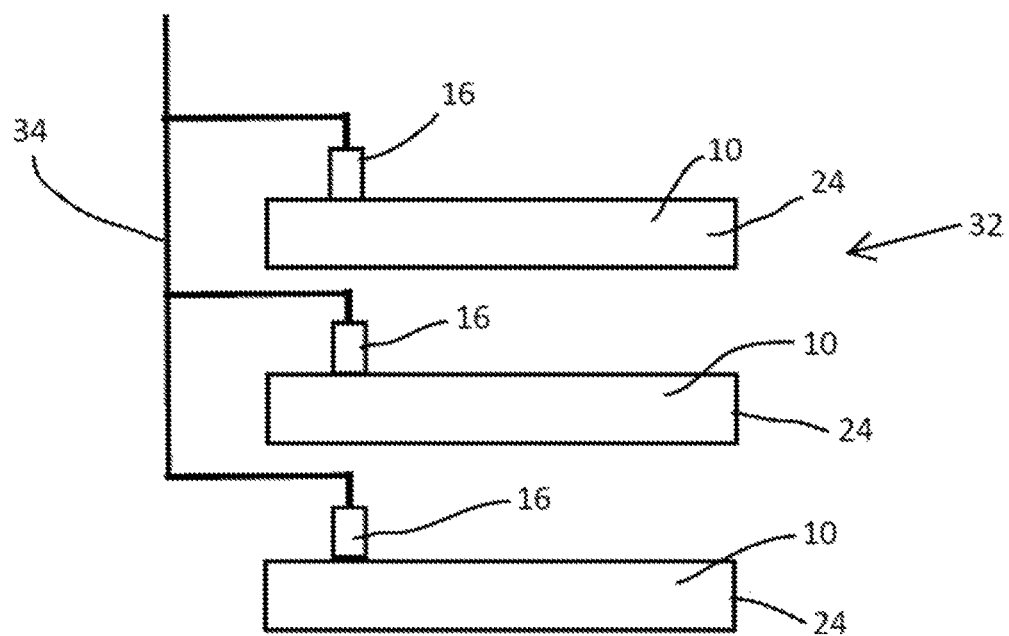

The invention will now be described, by way of example, with reference to the attached drawings, in which:

FIG. 1 schematically shows a condensate drain according to an embodiment of the invention;

FIG. 2 is a plot showing the trend of how capillary pressure changes dependent on pore size, for a number of different assumed contact angles; and FIG. 3 schematically shows a condensate drain array according to an embodiment of the invention.

FIG. 1 shows a condensate drain 10 according to an embodiment of the invention comprising a stainless steel cylindrical body 12 and a tubular porous membrane 14.

The body 12 extends along an axis A between a first closed end and a second opposing open end. An inlet port 16 is provided on the cylindrical wall of the body 12 towards the first closed end for attaching to a steam pipe (not shown) of a steam system so that steam and condensate can be introduced into the body 12.

A membrane mount 18 is provided within the body 12 coupled to the first closed end and has a circular recess for receiving an end of the tubular porous membrane 14. The membrane mount 18 and the circular recess are coaxial with the axis A of the body 12.

In this embodiment, the membrane 14 is in the form of a tube having an inner bore 20. One end of the tubular membrane 14 is received in the membrane mount 18 so that it extends coaxially within the body 12 along the axis A and projects towards the open end of the body 12.

The second open end of the body 12 is closed by a cap 22. The cap 22 has a central outlet port 24 extending therethrough and a counterbore or recess 26 for receiving and forming a seal with the projecting end of the membrane 14. In the wall of the recess 26 there is an annular groove in which there is disposed an O-ring 28 for forming the seal between the cap 22 and the end of the tubular membrane 14. The cap 22 may be coupled to the body 12 by any suitable means, for example, by a threaded connection.

The porous membrane 14 comprises an open wall ceramic membrane structure having a plurality of passageways (or pores) extending therethrough (i.e. extending from the inner bore 20 to the outer cylindrical wall of the tubular porous membrane 14). In this embodiment the tubular porous membrane 14 is composed of aluminium oxide ($Al_2O_3$). The cylindrical wall of the tubular membrane comprises multiple membranes layers supported on a core support structure, which layers gradually decrease in pore size (i.e. the pore size of the passageways) along a radially outward direction. The pore size of the supporting core structure is therefore greater than the controlling (i.e. minimum) pore size defined in the outer membrane layers. In this embodiment the membrane layers comprise the same material as the core structure (aluminium oxide). In other embodiments, the membrane layers may be composed of different materials from the core structure. For example, zirconium oxide ($ZrO_2$) or titanium oxide ($TiO_2$) may be suitable for the membrane layers, in particular for pore sizes of less than 0.2 microns (or micrometers), such as 0.005 microns to 0.1 or 0.2 microns. Aluminium oxide ($Al_2O_3$) may be particularly suitable for pore sizes of about 0.2 microns and above, such as 0.2 microns to 2 microns.

In this embodiment, there is a single inner bore 20 in the tubular porous membrane, but in other embodiments, the membrane 14 may have a plurality of bores 20 (or membrane channels) arranged in a pattern.

Since the membrane mount 18 and end cap 22 seal the membrane 14 within the body 12, there is an annular drain chamber 30 defined between the inner cylindrical surface of the body 12 and the outer cylindrical surface of the tubular porous membrane 14. The wall of the porous membrane 14 therefore serves as the only means of fluid communication between the annular drain chamber 30 and the inner bore 20.

In this embodiment, the outer layers of the membrane structure have a pore size of approximately 0.05 microns, so that the smallest pore size in each channel between the outer and inner surfaces of the membrane 14 (i.e. through the wall of the membrane 14) is 0.05 microns.

In this embodiment, the body 12 is approximately 200 mm long and 80 mm in diameter. The membrane 14 is approximately 200 mm long and 50 mm in diameter. The diameter of the inner bore 20 is approximately 25 mm.

An example in which the condensate drain 10 is used to discharge condensate from a high pressure steam system will now be described, by way of example.

In use, the inlet 16 of the steam trap 10 is coupled to a steam pipe of a steam system (not shown) so that steam and/or condensate can be provided to the annular drain chamber 30, and the outlet port 24 is coupled to a condensate outlet pipe for connecting to a condensate return system which is configured to collect condensate from various points in the steam system.

During a start-up phase of the steam system, air and non-condensable gases are vented through the dry condensate drain as a mixture of steam and condensate is introduced into the steam system. As the steam system starts up, steam introduced to the system will tend to condense so that liquid water (or condensate) collects at the condensate drain. During the start-up phase, the pressure of the steam and condensate introduced gradually increases. In this example, the pressure may increase to reach 17 bar gauge pressure.

The liquid water (or condensate) present in the annular drain chamber 30 is driven through the passageways (or pores) in the tubular porous membrane and into the inner bore 20 owing to the 17 bar pressure difference acting over the membrane 14. The liquid water is driven through the outlet pipe so that it is in fluid communication with the condensate return system. The outlet side of the porous membrane 14 (i.e. the wall of the inner bore 20, in this embodiment) is therefore wetted by the condensate.

Once the outer cylindrical surface of the membrane 14 is free of liquid water, the steam present in the annular drain chamber 30 acts against a large number of individual columns or channels of liquid water that extend through the passageways defined in the open cell structure of the membrane 14. The columns of liquid water (or condensate) are drawn into the passageways from the wetted inner cylindrical surface of the tubular membrane 14 that is exposed to liquid water (or condensate) in the inner bore 20. In particular, each column is drawn into a passageway owing to the surface tension force acting on its meniscus and the adhesion force acting between the liquid water and the material of the passageway. These static pressure and capillary forces act on the meniscus of each column in opposite directions, and determine whether each column of liquid water is maintained within the passageway or is forced back through the membrane by the steam.

The pressure required to force a column of fluid back through a passageway into which it is drawn is the capillary pressure, $P_C$, and depends on the surface tension of the fluid, the contact angle between the fluid and the passageway, and the pore size of the passageway, as shown in Equation 1.

$$P_C = \frac{2\gamma\cos\theta}{r} \qquad \text{Equation 1}$$

In Equation 1, $P_C$ is the capillary pressure, $\gamma$ is the surface tension of a free surface of liquid water in steam, $\theta$ is the contact angle of water with the passageways of the membrane, and r is the radius of the effective pore size (i.e. the minimum pore size of each passageway).

As will be appreciated, in this embodiment the material of the membrane 14 (aluminium oxide) is hydrophilic, and so the contact angle of liquid water with the membrane channels is low, for example, less than 60°. The contact angle depends on the material of the pores, and any degree of contamination present in the membrane 14.

Equation 1 shows that, despite a large pressure difference acting over the meniscus of each column, the surface tension force and adhesion force between the liquid water and the passageway can maintain the column within the passageway if the capillary pressure is greater than the pressure difference.

Given the inverse relationship between the pressure difference $\Delta P$ and the pore size (represented in Equation 1 by the radius r), a sufficiently small pore size means that the capillary pressure is at least as great as the pressure difference acting over the passageway. Accordingly, the column of water will remain in the passageway and there will be a free surface of liquid water in the passageway that prevents steam from migrating through the membrane 14 to the outlet port 24.

When condensate arrives at the condensate drain 10 through the inlet port 16, it flows into the annular chamber 30. Any condensate coming into contact with the outer cylindrical surface of the membrane 14 is drawn into the passageway via the same capillary forces, and flows towards the column of liquid water held therein. Upon meeting the column of water, the condensate flows into the column of water. Rather than growing within the passageway, the height of each column of water equilibrates according to the static forces acting on the meniscus (which are unchanged), and therefore there is a net flow of condensate through the membrane 14, into the inner bore 20 and out of the outlet pipe.

Accordingly, if the capillary pressure is greater than the pressure difference then the membrane prevents the passage of steam, but allows the passage of condensate, and thus acts as a condensate drain and steam trap.

However, if the pressure difference $\Delta P$ rises above the capillary pressure $P_C$ (i.e. if the pressure force becomes greater than the forces acting on the meniscus of each column of water owing to capillary action), then the column of liquid water will be forced through the pore by the steam, and steam will subsequently flow continuously through the pore into the inner bore 20 of the membrane 14 and through the outlet 24. Under such conditions, the condensate drain 10 ceases to contain the steam, and therefore ceases to act as a steam trap.

The relationship between pore size r, contact angle $\theta$ and pressure is therefore of importance to the correct function of the condensate drain 10. FIG. 2 shows a prediction of the capillary pressure P for a range of pore sizes for selected contact predicted angles of 60°, 40°, 20° and 0°.

In this particular example, the capillary pressure for a pore size of 0.05 microns is between 15 and 25 bar, depending on the contact angle (i.e. for a contact angle range of between 60° and 0°), and is at least 20 bar if the contact angle is 40° or less.

In other embodiments, the condensate drain 10 may be arranged differently. For example, there may be a plurality of tubular porous membranes 14 disposed within the body 12, the inner bores 20 of which may be coupled to a common manifold.

Further, although it has been described that the condensate drain is configured to receive steam and condensate into a chamber surrounding the tubular membrane, and to discharge condensate from the or each inner bore of the tubular membrane, it will be appreciated that in other embodiments the flow direction may be reversed. In particular, the condensate drain may be configured so that steam and condensate are supplied to the or each inner bore of the or each tubular porous membrane, and condensate may be discharged from the chamber surrounding the or each membrane.

Although embodiments of the invention have been described in which there is a tubular porous membrane, in other embodiments the membrane may be of any suitable size or shape. For example, the membrane may be substantially planar and may separate a first chamber from a second chamber. For example, the membrane may separate a first upper chamber for receiving steam and condensate from a second lower chamber for discharging condensate. The condensate drain may be configured so that the side of the membrane exposed to the chamber for discharging condensate remains wetted so that columns of liquid water are urged into the membrane owing to capillary forces.

Although an embodiment of the invention has been described in which the core structure of the porous membrane is a radially inner structure surrounded by radially outer membrane layers of gradually decreasing pore size, it will be appreciated that the porous membrane may have any suitable structure. For example, the pore size may be substantially continuous throughout the porous membrane. Further, the pore size may reduce along a radially inward direction of a tubular porous membrane. Further, the porous membrane may not be tubular, and the pore size may generally reduce from an inlet side (i.e. a side in communication with the liquid-gas inlet) towards an outlet side (i.e. a side of the membrane in communication with the liquid outlet) or vice versa.

FIG. 3 illustrates a condensate drain array 32 including a plurality of condensate drains 10 as shown in FIG. 1 connected in parallel, with the liquid-gas inlets 16 of the condensate drains 10 in fluid communication with a common liquid-gas inlet 34, according to one embodiment.

Although an embodiment of the invention has been described in which the condensate drain is coupled to a steam system and serves as a steam trap for discharging condensate and retaining steam, it will be appreciated that the condensate drain is equally applicable to other systems having a mixture of gas and liquid flow, such as compressed air system and other compressed gas systems such as refrigerant systems.

We claim:

1. A compressed gas installation comprising a compressed gas system and a condensate drain, the condensate drain comprising:
   a body defining a drain chamber and having:
      a liquid-gas inlet coupled to the compressed gas system to receive condensate into the drain chamber; and
      a liquid outlet coupled to a condensate return system of the compressed gas system for collecting condensate; and
   a porous membrane disposed within the body between the liquid-gas inlet and the liquid outlet and having:
      an inlet side in fluid communication with the liquid-gas inlet;

an outlet side in fluid communication with the liquid outlet; and a plurality of passageways extending from the inlet side to the outlet side, each having a pore size of about 0.2 µm or less;

wherein in use, the porous membrane permits liquid to pass therethrough but restricts the passage of gas; and wherein the condensate drain is configured in the compressed gas installation such that, in use, the outlet side of the porous membrane is maintained wetted.

2. The compressed gas installation according to claim 1, wherein the pore size of each of the plurality of passageways is one of: about 0.15 µm or less, about 0.1 µm or less, about 0.08 µm or less, about 0.06 µm or less, and about 0.04 µm or less.

3. The compressed gas installation according to claim 1, wherein the pore size is non-constant along each passageway and wherein the minimum pore size of each passageway is about 0.2 µm or less.

4. The compressed gas installation according to claim 1, wherein the porous membrane comprises a support structure, and wherein the pore size of the passageways in a region of the support structure is greater than 0.2 µm.

5. The compressed gas installation according to claim 1, wherein a porosity of the porous membrane is one of: between about 10-50%, or about 20-40%, or between about 30-35%.

6. The compressed gas installation according to claim 1, wherein the porous membrane has an area of 0.02 to 0.5 meters^2.

7. The compressed gas installation according to claim 1, wherein the porous membrane is hydrophilic.

8. The compressed gas installation according to claim 1, wherein the porous membrane comprises a ceramic porous membrane.

9. The compressed gas installation according to claim 1, wherein the condensate drain is configured such that, in use, the liquid outlet is disposed at or above a level of the porous membrane.

10. The compressed gas installation according to claim 1, wherein the condensate drain is free of moving parts.

11. The compressed gas installation according to claim 1, wherein the condensate drain is a first condensate drain within plurality of condensate drains that collectively form a condensate drain array, each condensate drain of the array being connected in parallel with the respective liquid-gas inlets in fluid communication with a common liquid-gas inlet.

12. The compressed gas installation according to claim 1, wherein the porous membrane is a tubular porous membrane, and wherein one of the liquid-gas inlet or the liquid outlet is in fluid communication with an interior of the tubular porous membrane.

13. The compressed gas installation according to claim 12, wherein the tubular porous membrane comprises a plurality of interior channels.

14. The compressed gas installation according to claim 12, wherein there is a plurality of tubular porous membranes disposed within the body, and wherein one of the liquid-gas inlet or the liquid outlet is in fluid communication with the interior of each tubular porous membrane.

15. The compressed gas installation according to claim 12, wherein the body is a tubular body.

16. The compressed gas installation according to claim 15, wherein the drain chamber is defined between an exterior of the tubular porous membrane and an interior of the tubular body, and wherein one of the liquid-gas inlet or the liquid outlet is provided in a side wall of the tubular body and opens into the drain chamber.

17. A method of using of a condensate drain that comprises:

a body defining a drain chamber having a liquid-gas inlet and a liquid outlet; and a porous membrane disposed within the body between the liquid-gas inlet and the liquid outlet and comprising:

an inlet side in fluid communication with the liquid-gas inlet;

an outlet side in fluid communication with the liquid outlet; and a plurality of passageways extending from the inlet side to the outlet side, each having a pore size of about 0.2 µm or less;

wherein the method comprises:

maintaining the outlet side of the porous membrane wetted;

receiving condensate and gas into the drain chamber through the liquid-gas inlet so that condensate passes through the porous membrane and the passage of gas therethrough is restricted; and discharging condensate through the liquid outlet.

18. A method according to claim 17, wherein the method is performed while the condensate drain is installed in a compressed gas installation.

* * * * *